W. H. KEYS.
PACKING RING.
APPLICATION FILED MAR. 14, 1916.
1,207,770.  Patented Dec. 12, 1916.
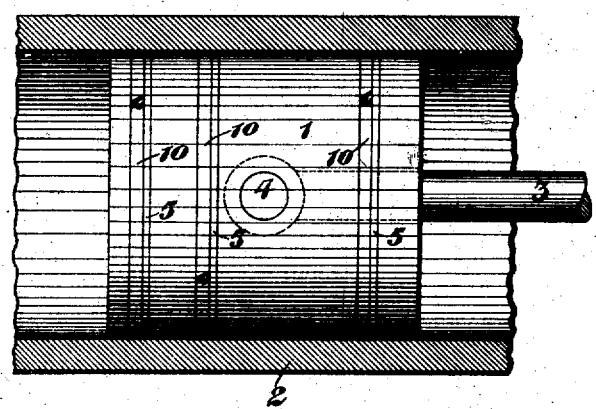
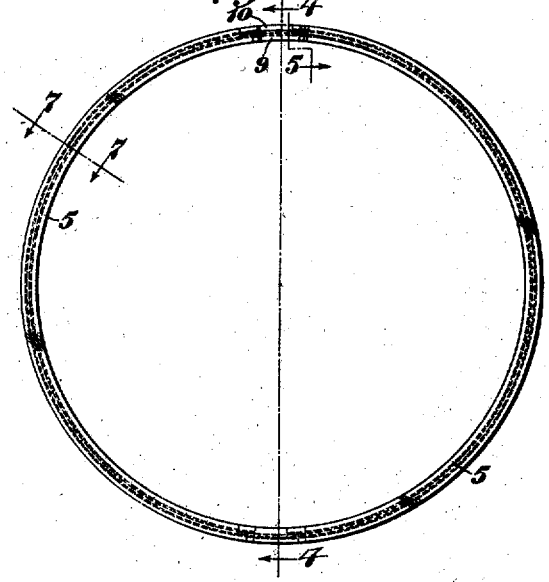
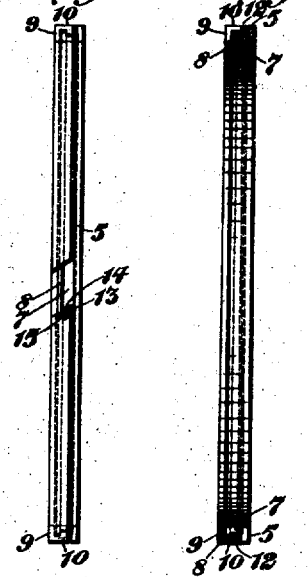
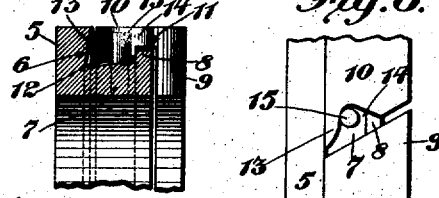
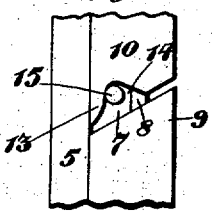
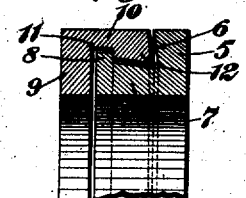
Attest:
Charles A. Becker.
Inventor.
William H. Keys,
by his Attorneys

UNITED STATES PATENT OFFICE.

WILLIAM H. KEYS, OF ST. LOUIS, MISSOURI.

PACKING-RING.

1,207,770.        Specification of Letters Patent.        Patented Dec. 12, 1916.

Application filed March 14, 1916. Serial No. 84,030.

*To all whom it may concern:*

Be it known that I, WILLIAM H. KEYS, a citizen of the United States, residing at St. Louis, Missouri, have invented a new and useful Packing-Ring, of which the following is a specification.

This invention relates to packing rings for reciprocating pistons.

The object of the invention is to provide an improved packing adapted for use upon a reciprocating piston and composed of an inner ring including a part arranged to operate against the surface of the cylinder and provided with a laterally extended portion having a circumferential groove in its periphery provided with an oblique bottom wall and defined on one side by an oblique wall at the side of the portion which operates against the cylinder and defined on the other side by a wall at right angles to the axis of the ring, which last-mentioned wall is the inner wall of a circumferential flange at the side edge of the laterally extended portion of the ring, in combination with an outer ring including a portion at the side of the flange and a portion extending over and encircling the laterally extended portion of the first-named ring and having an internal groove for receiving the flange mentioned, and an obliquely formed part arranged to engage within the circumferential groove of the other ring to limit lateral movement of the two rings relative to each other, said two rings being spaced whereby passages for lubricant are provided between adjacent portions thereof.

In the drawings, Figure 1 is a sectional view of a cylinder having a piston mounted therein provided with my improved packing. Fig. 2 is an enlarged side edge elevation of the packing in its expanded form. Fig. 3 is a view looking toward the periphery of the expanded packing. Fig. 4 is a sectional view on the line 4—4 of Fig. 2. Fig. 5 is an enlarged sectional view taken on the line indicated at 5 in Fig. 2. Fig. 6 is a view illustrating the construction of the overlapping ends of the outer ring and the abutment on the inner ring for limiting relative rotary movement of the two rings. Fig. 7 is a sectional view on the line 7—7 of Fig. 2.

The piston 1 is of the usual reciprocating type arranged to operate within the cylinder 2 and to transmit power through the medium of a pitman 3 which is connected to the piston by a pivot device 4. The piston is provided with a number of circumferential grooves adapted to receive the packing and I have illustrated three packing rings mounted upon the piston, although it is obvious that the number may be varied as required.

Each packing includes a ring 5 of the open resilient type adapted to be seated within one of the grooves of the piston and to press against the cylinder wall. The ring 5 is formed at one side with an oblique wall 6 and on the same side of the ring there is a laterally extended portion 7 having a circumferential flange 8 at its side edge. The inner wall of the flange 8 is at right angles to the axis of the ring and the peripheral wall of the portion 7 extends obliquely from the flange 8 toward the axis of the ring and with the oblique wall 6 forms a substantially V-shaped groove.

The packing also includes an additional ring comprising a part 9 at the side of the laterally extended portion 7 of the ring above described and a part 10 which is arranged to encircle the laterally extended portion 7 and to coöperate with the ring 5 to operate against the surface of the cylinder. The part 10 is formed with an internal groove 11 arranged to receive the flange 8 and said groove is somewhat wider than the flange 8 so that the two rings may be capable of slight lateral movement relative to each other. The part 10 also has an internal flange 12 arranged to seat within the groove in the laterally extended portion 7 of the ring 5. The side wall of the flange 12 and the part 10 has the same angle of obliquity relative to the axis of the ring as the wall 6, so that said two walls will form a close joint when pressed together. The inner wall of the flange 12 corresponds to the wall at the bottom of the circumferential groove in the laterally extended portion 7 of the ring 5, but the flange 12 is of less width than the groove in which it is engaged, thus enabling the two rings even when assembled to have slight lateral movement relative to each other.

I have provided a coöperating device whereby the two rings are pressed together when under compression within the cylinder, so that the oblique side wall of the part 10 and flange 12 is held closely against the oblique wall 6, thus holding the flange 12 away from the flange 8 and leaving a passage between said flanges through which lubricant may freely pass to prevent sticking or binding of the rings. At one end of the part 10 a tapering projection 13 is formed by cutting out a portion of the part 10 to provide a recess 14. The projection 13 is at the inner side edge of the part 10 and when the rings are compressed, as they are within the cylinder, an abutment pin 15 on the portion 7 of the ring 5 engages the projection 13 and thereby presses the two rings together, so that the flanges 8 and 12 are separated, leaving an oil passage between the two rings. The recess 14 constitutes a chamber adapted to contain a quantity of oil and said chamber is in communication with the passage formed by separating the flanges 8 and 12 which is effected as an incident to the compression of the packing within the cylinder. The abutment 15 performs the dual function of preventing relative rotation of the two rings and of pressing the two rings together when under compression.

What I claim and desire to secure by Letters Patent of the United States is:—

1. A packing comprising a ring adapted to press against the wall of the cylinder in which the ring is mounted, a laterally extended portion integral with said ring provided with a circumferential groove, an additional ring encircling the laterally extended portion and adapted to press against the wall of the cylinder, a flange on the additional ring engaging in said groove, an abutment limiting relative rotation of said two rings, a part on one of said rings cooperating with said abutment to press the two rings laterally toward each other as an incident to compression of the two rings, and a passage for lubricant between said rings.

2. A packing comprising a ring adapted to press against the wall of the cylinder in which the ring is mounted and formed with an oblique wall at one side, a laterally extended portion integral with the ring on the same side as the oblique wall, a circumferential flange at the side edge of said laterally extended portion, an additional ring encircling the laterally extended portion and formed with an internal groove receiving said flange and provided with an oblique wall bearing against the oblique wall of the first-named ring, an abutment on the laterally extended portion spaced from the oblique wall of the first-named ring, a projection on the second-named ring arranged to extend between said abutment and the oblique wall of the first-named ring to press said rings laterally toward each other as an incident to compression thereof, an oil chamber in the second-named ring, and a passage between said rings communicating with said chamber.

3. A packing comprising a ring adapted to press against the wall of the cylinder in which the ring is mounted and provided with an oblique wall on one side, a laterally extended portion on the same side as the oblique wall, a flange at the side edge of the laterally extended portion having its inner wall at right angles to the axis of the ring, the peripheral wall of the laterally extended portion extending obliquely from said flange toward the axis of the ring to intersection with the first-named oblique wall, an additional ring composed of a part at the side of the laterally extended portion and a part encircling the laterally extended portion, the last-named part of said additional ring having an oblique side wall and an oblique inner wall matching the two oblique walls of the first-named ring, and said additional ring also having an internal groove receiving and being wider than said flange, whereby said rings are capable of slight lateral movement relative to each other, an abutment on the laterally extended portion of the first-named ring, and spaced from the oblique wall at the side edge thereof, a tapering projection on the second-named ring arranged to pass between said abutment and said oblique wall to press said two rings together as an incident to compression thereof, and an oil chamber formed in the second-named ring and communicating with said groove.

4. A packing comprising a ring, a laterally extended portion on said ring, a circumferential groove in said laterally extended portion, an additional ring, a portion in connection with said additional ring encircling the laterally extended portion of the first-named ring, a flange in connection with said encircling portion engaging in said groove, an abutment for limiting relative rotation of said two rings, a part on one of said rings cooperating with said abutment to press the two rings laterally toward each other as an incident to compression of said two rings, an oil chamber in one of said rings, and a passage between said rings communicating with said chamber.

In witness whereof, I have signed this specification in the presence of two subscribing witnesses.

WILLIAM H. KEYS.

Witnesses:
N. G. BUTLER,
JOHN D. RIPPEY.